United States Patent
Mikami

(10) Patent No.: US 6,508,517 B2
(45) Date of Patent: Jan. 21, 2003

(54) STRUCTURE AND METHOD FOR CONNECTING RIM AND DISK INTEGRATED WHEELS

(75) Inventor: Celestino Mikami, Sao Paulo (BR)

(73) Assignee: Meritor DO Brasil LTDA, Troy, MI (US)

( * ) Notice: Subject to any disclaimer, the term of this patent is extended or adjusted under 35 U.S.C. 154(b) by 0 days.

(21) Appl. No.: 09/973,861

(22) Filed: Oct. 9, 2001

(65) Prior Publication Data

US 2002/0057009 A1 May 16, 2002

Related U.S. Application Data

(63) Continuation of application No. 09/381,327, filed as application No. PCT/US98/05336 on Mar. 18, 1998.

(30) Foreign Application Priority Data

Mar. 19, 1997 (BR) ................................. 9701349

(51) Int. Cl.[7] .................................................. B60B 3/10
(52) U.S. Cl. ............................. 301/63.103; 301/95.101
(58) Field of Search ....................... 301/63.103, 95.101, 301/63.104, 63.105, 63.107

(56) References Cited

U.S. PATENT DOCUMENTS

| | | | |
|---|---|---|---|
| 5,345,676 A | | 9/1994 | Ashley |
| 5,634,694 A | * | 6/1997 | Murray et al. .......... 301/63.103 |
| 6,030,051 A | * | 2/2000 | Hosoda et al. ......... 301/63.103 |
| 6,036,280 A | * | 3/2000 | Stanavich .............. 301/63.103 |
| 6,213,563 B1 | | 4/2001 | Heck et al. |

FOREIGN PATENT DOCUMENTS

| | | |
|---|---|---|
| GB | 434 044 A | 3/1935 |
| JP | 04 305388 A | 10/1992 |
| WO | WO85 02586 A | 6/1985 |
| WO | WO96 18753 A | 6/1996 |
| WO | WO97 47482 A | 12/1997 |

OTHER PUBLICATIONS

International Search Report completed on Jul. 23, 1998.

* cited by examiner

Primary Examiner—S. Joseph Morano
Assistant Examiner—Long Bao Nguyen
(74) Attorney, Agent, or Firm—Carlson, Gaskey & Olds

(57) ABSTRACT

A unique integrated wheel is disclosed wherein a groove is formed with an angled surface to facilitate the flow of a weld material. A rim extends into the groove and has surfaces which act in conjunction with the surface of the groove to provide proper positioning and a secure connection. In addition, a method of forming the disk is disclosed.

17 Claims, 4 Drawing Sheets

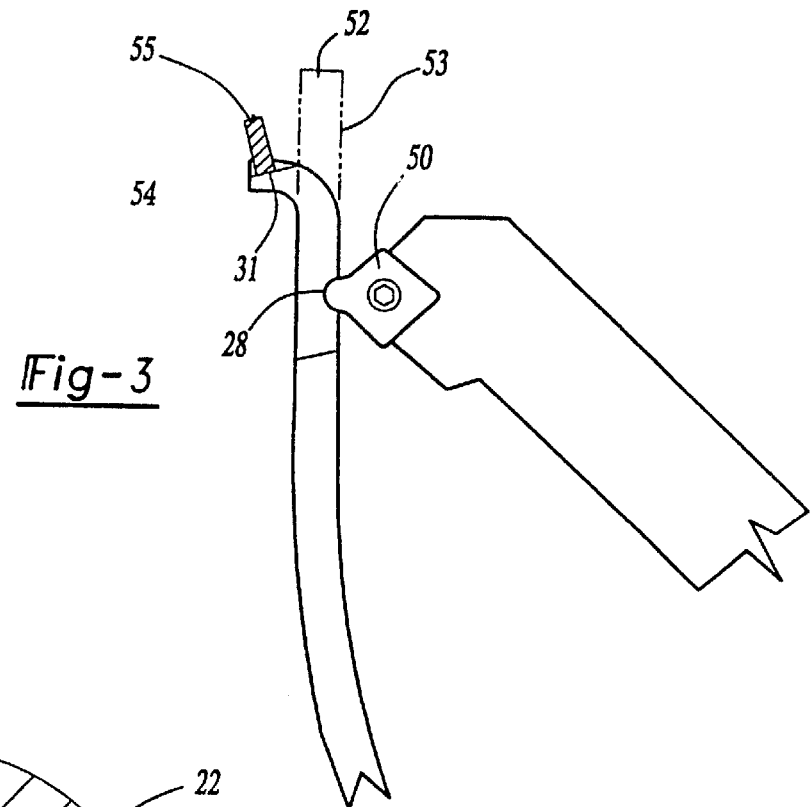
_Fig-3_
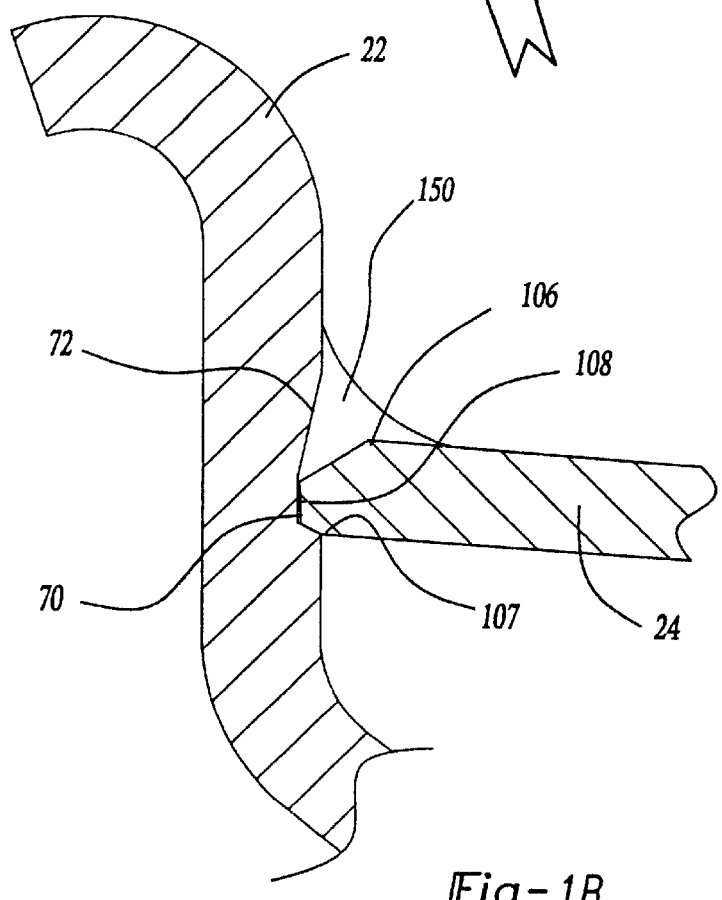
_Fig-1B_

STRUCTURE AND METHOD FOR CONNECTING RIM AND DISK INTEGRATED WHEELS

The present application is a continuation of U.S. patent application Ser. No. 09/381,327 filed on Mar. 18, 1999.

BACKGROUND OF THE INVENTION

This application relates to a unique connection between a rim and a disk in an integrated wheel.

Integrated wheels are known, in which a disk provides the entire forward face of the wheel. A rim is attached to a rear face of the disk, and provides the other structure for properly mounting the tire.

Many methods have been utilized to connect the rim to the disk. In one common method, the rim and disks have been provided with telescopic structure which interfit to connect the two members.

Another type of integrated wheel has the rim welded to a rear face of the disk. This method has some deficiencies in that proper positioning has been a challenge.

It is also known to provide a groove in the rear face of the disk and have the rim extend into the groove. The rim is then welded in the groove securing the two parts together. The groove has some desirable characteristics compared to the other types of prior art in that it does assist in providing a secure connection and in properly positioning the rim relative to the disk. However, it would be desirable to improve upon the shape of the groove and the portion of the rim received in the groove.

SUMMARY OF THE INVENTION

In a disclosed embodiment of this invention, various configurations are provided for a groove in the rear face of a disk and the inner end of the rim. In addition, an outer sealing bead is also manufactured in a unique way.

In particular, a number of unique groove embodiments are disclosed in combination with several different rim embodiments which provide a better weld joint and better positioning of the two parts. In one embodiment, the rim and the groove have a roughly equivalent cross-section such that the rim is closely secured within the groove and that the weld joint can provide a good interface between the two. In other embodiments, the groove and the rim have distinct configurations. In particular, it is preferred that the groove have angled surfaces to facilitate the flow of the weld material. In a most preferred embodiment of this invention, the groove has one angled surface moving downwardly to a side wall. The rim for this embodiment has an angled inner face leading to an end face. The angled face of the rim, along with the angled face of the groove, facilitates material flow onto both sides of the rim. The weld joint may be achieved by known welding techniques, such as friction welding.

In a method, an outer surface of the disk is initially formed to be generally planar. The outer part is then bent axially outwardly. Portions of the axially outermost and radially outermost portions are then machined away. In one embodiment, intended for a painted surface, the surface is removed in a curved configuration. In a second embodiment, intended for receiving a cladding skin, a ledge is formed in the outer surface to receive a cladding portion.

These and other features of the present invention can be best understood from the following specification and drawings, the following of which is a brief description.

BRIEF DESCRIPTION OF THE DRAWINGS

FIG. 3 shows a step in machining the disk of this invention.

DETAILED DESCRIPTION OF THE PREFERRED EMBODIMENT

Figure 1A:
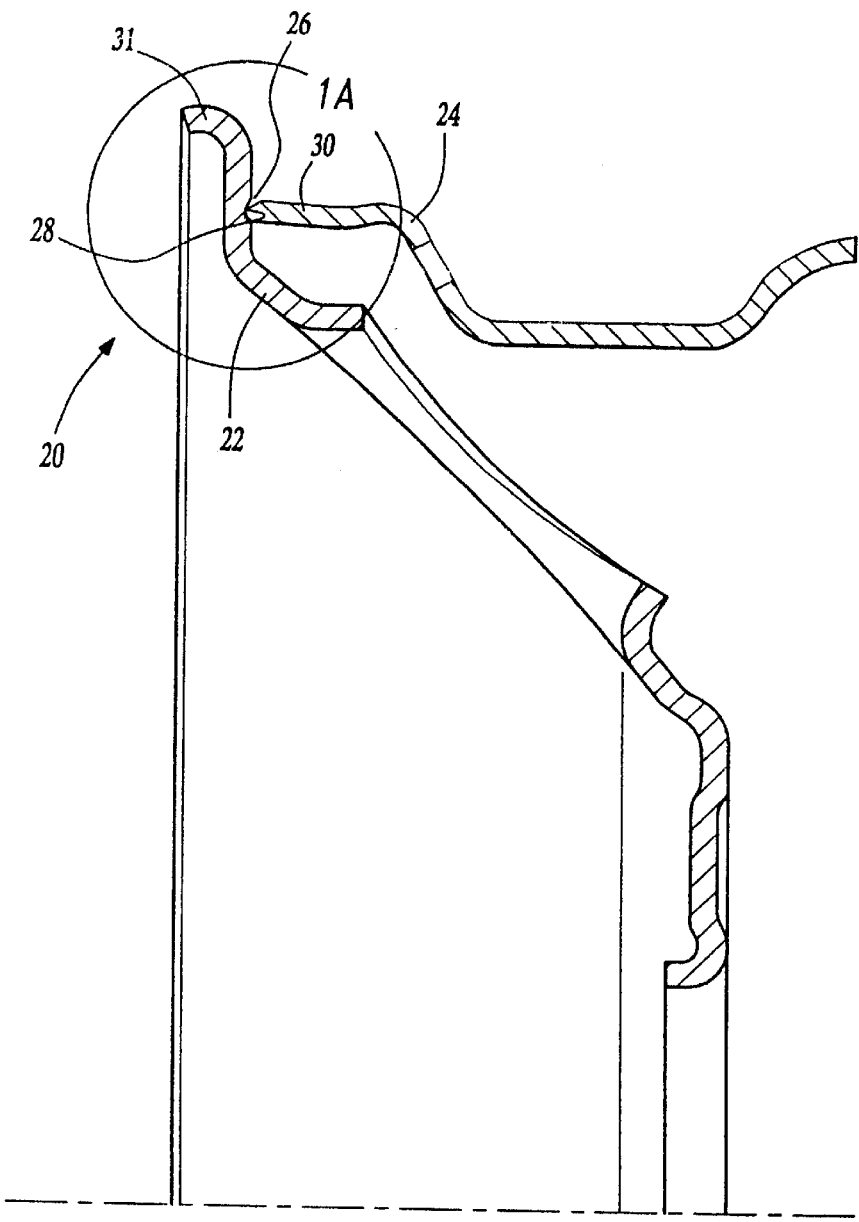
FIG. 1 is a side view of an integrated wheel showing features of the present invention.
FIG. 1B is an enlarged view of a portion of FIG. 1 showing the connection of the rim to the disk.

FIG. 1A shows an integrated wheel 20 having a disk 22 secured to a rim 24. As shown, a weld joint 26 is placed near a groove 28 to secure an end 30 of the rim 24. The preferred shapes of the groove and rim will be detailed below. As shown at 31, the radially and axially outermost portion of the disk is curved. A feature of this invention is the unique way that this surface is formed, as will be explained below. This shape is particularly well-suited for a wheel wherein the disk is to be painted.

FIG. 1B shows the preferred assembly such as shown in FIG. 1A. This combination combines the FIG. 5 groove 66 with the FIG. 11 rim 110. The surface 68 in combination with the surface 116 includes appropriate angles to ensure correct positioning and assembly, and to ensure the radial concentricity of the final wheel.

FIG. 1 shows an integrated wheel 20 having a disk 22 secured to a rim 24. As shown, a weld joint 26 is placed near a groove 28 to secure an end 30 of the rim 24. The preferred shapes of the groove and rim will be detailed below. As shown at 31, the radially and axially outermost portion of the disk is curved. A feature of this invention is the unique way that this surface is formed, as will be explained below. This shape is particularly well-suited for a wheel wherein the disk is to be painted.

Figure 2:
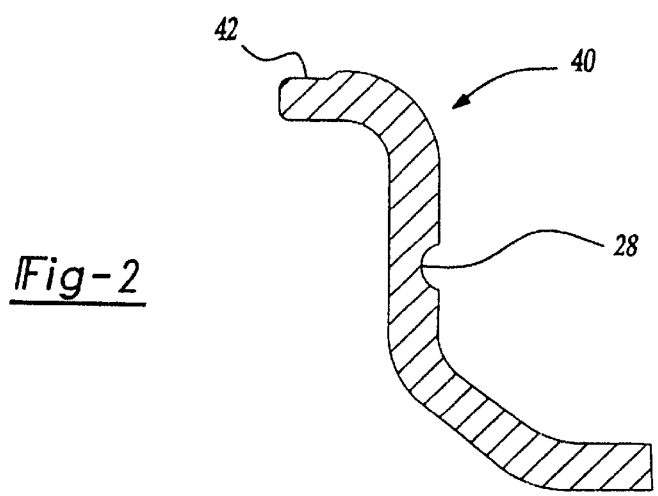
FIG. 2 shows a second embodiment of the inventive full face wheel.

FIG. 2 shows a disk embodiment 40 wherein a notch 42 is formed in the radially and axially outermost surfaces of the disk. This embodiment is particularly well-suited to receive a cladding skin.

FIG. 3 shows a method of forming the inventive disk. As shown, a cutting tool 50 cuts the groove 28 into the disk. As will be disclosed below, there are many possible shapes for the groove, and the cutting tool 50 can cut any one of the shapes. It is well within the skill of a worker in this art to define a cutting tool for cutting a particular shape.

As shown in FIG. 3, the disk is initially formed with a flange 52 extending generally planar with the remainder of the disk. That portion is deformed by a tool 53, shown schematically to extend axially forwardly as shown at 54. Another tool 55 machines surface 31, such as shown in FIG. 1 (or alternatively, the shape 42 as shown in FIG. 2).

Figure 4:
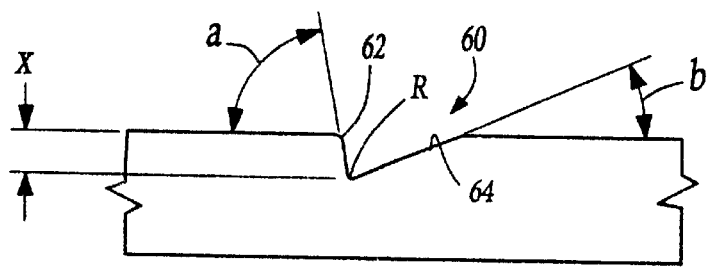
FIG. 4 shows a first embodiment groove.

As show in FIG. 4, embodiment 60 groove has a surface 62 defined at an angle a, which is designed to provide proper positioning and strong attachment to the rim and the groove. A surface 64 is defined at an angle b, designed to receive the melted weld material by the deposed weld joint, or the melting of the disk and rim during the welding process. The groove 60 deepest depth is set forth by a dimension x.

Figure 5:
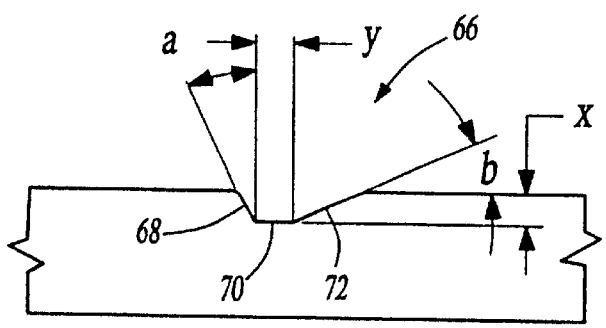
FIG. 5 shows a second embodiment groove.

FIG. 5 shows a groove 66 with three surfaces 68, 70 and 72. Surface 68 is set forth at an angle a, which is intended to facilitate the attachment of the rim into the disk groove. Surface 70 extends for a dimension y, and surface 3 is angled at an angle b, which again functions to receive the weld material.

Figure 6:
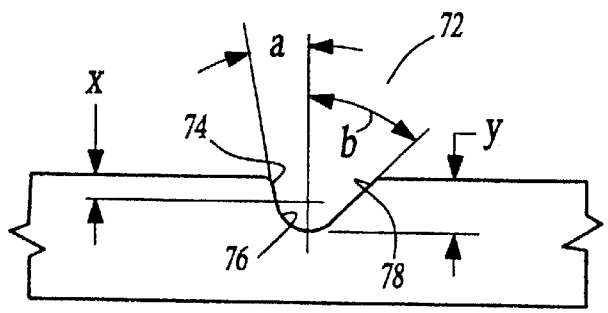
FIG. 6 shows a third embodiment groove.

FIG. 6 shows an embodiment 72 having a first flat surface 74 extending for a distance x, and defined at an angle a relative to a vertical plane, with the angle a facilitating the attachment of the rim into the disk groove. A second surface 76 is curved and formed at a radius R from the end point of surface 74 extended into the plane extending perpendicularly into the groove 72. A third surface 78 is angled at an angle b, and again functions to receive the weld material.

Figure 7:
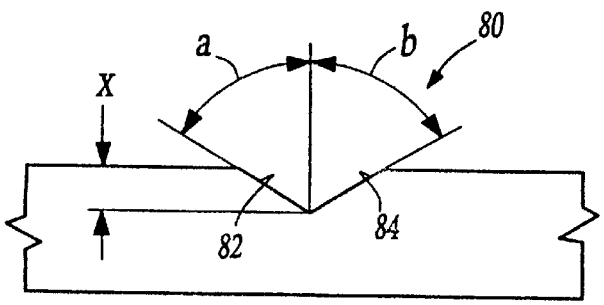
FIG. 7 shows a fourth embodiment groove.

FIG. 7 shows a groove 80 with the first surface 82 defined at an angle a which facilitates the attachment of the rim into the disk, and also receives melted weld material which is deposited, or from the base rim or disk during the welding process. The surface 82 is limited to a depth x. The second surface 84 is set at an angle b, again to facilitate the attachment of the rim into the disk groove and receive the melted weld material. This surface 84 also extends to a depth x.

Figure 8:
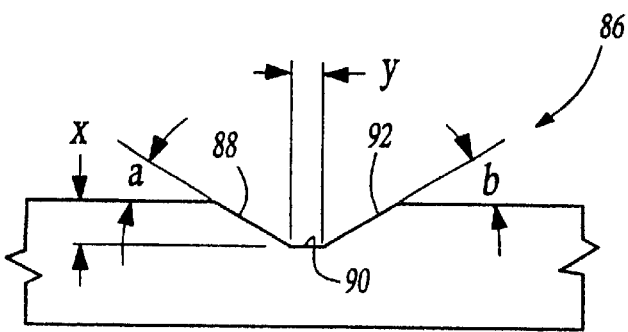
FIG. 8 shows a fifth embodiment groove.

Groove 86 is shown in FIG. 8, and has a surface 88 defined at an angle a relative to a vertical plane, a flat surface 90 extending over a width y, and a second angled surface 92 defined at an angle b. The surfaces 88 and 92 provide functions similar to the above-discussed grooves. The grooves depth is again set by the dimension x.

Figure 9:
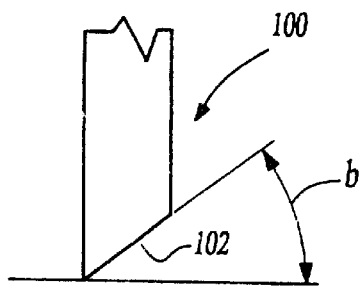
FIG. 9 shows a first embodiment rim end portion.

FIG. 9 shows a first embodiment rim end portion 100 having an angled end surface 102 defined at an angle b which facilitates the attachment into the disk groove, and also provides a space for weld material. This rim is particularly well-suited to the groove shown in FIG. 4.

Figure 10:
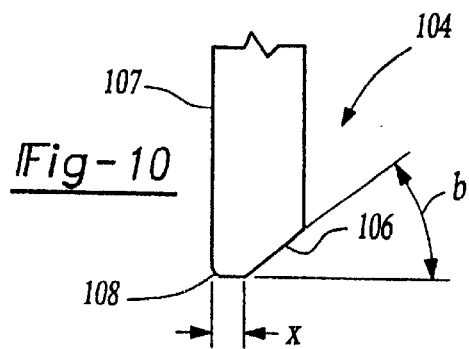
FIG. 10 shows a second embodiment rim end portion.

FIG. 10 shows a rim 104 having an angled surface 106 defined at the angle b, again for weld material. A surface 108 is formed at the end, and is generally flat and extends over a distance x. The function of this surface is to rest into the disk groove. This rim also has a curved edge shown by the radius R. This rim is particularly well-suited for the groove of FIG. 5.

Figure 11:
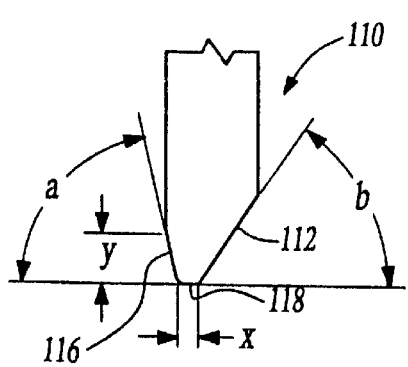
FIG. 11 shows a third embodiment rim end portion.

FIG. 11 shows a rim 110 having a surface 112 defined at an angle b which is for weld material. A second flat surface 114 extends over a distance x and assists in the resting of the rim in the groove. A surface 116 extends upwardly for a distance y at an angle a, and facilitates the attachment of the rim into the disk groove. This rim is particularly well-suited for the groove shown in FIG. 5.

Figure 12:
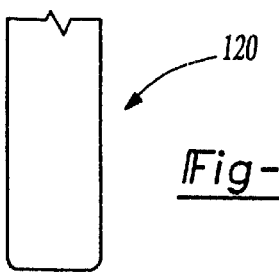
FIG. 12 shows a fourth embodiment rim end portion.

FIG. 12 shows a rim embodiment 120 having curved edges 122 formed about a radius R. Flat surface 124 assists the rim in resting within its groove. This rim is particularly well-suited for the groove shown in FIG. 8.

Figure 13:
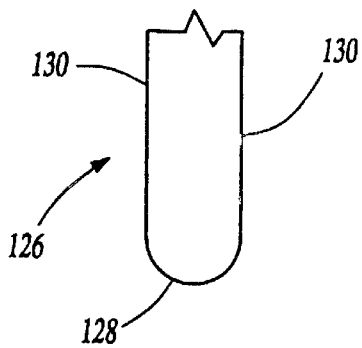
FIG. 13 shows a fifth embodiment rim end portion.

FIG. 13 shows a rim embodiment 126 having a curved surface 128 which rests in the groove. The curved surface 128 is formed at a radius R. The side surfaces 130 provide contact space for weld material. This rim is particularly well-suited to be used with the groove shown in FIG. 6.

Figure 14:
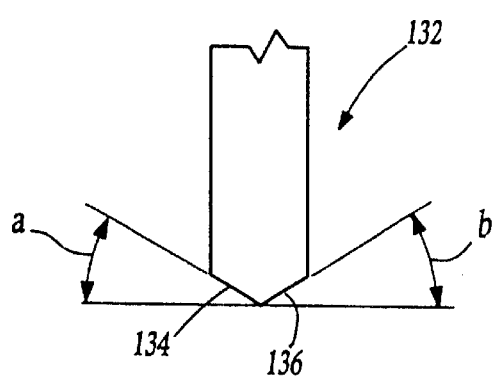
FIG. 14 shows a sixth embodiment rim end portion.

FIG. 14 shows a rim embodiment 132. Rim embodiment 132 has a first side surface 134 formed at an angle a, and provides an improved attachment of the rim to the disk groove, and a space for weld material. A second surface 136 is formed at an angle b, and functions for welding material. The rim 132 is particularly well-suited to be used with the grooves shown in FIGS. 7 or 8.

Figure 15:
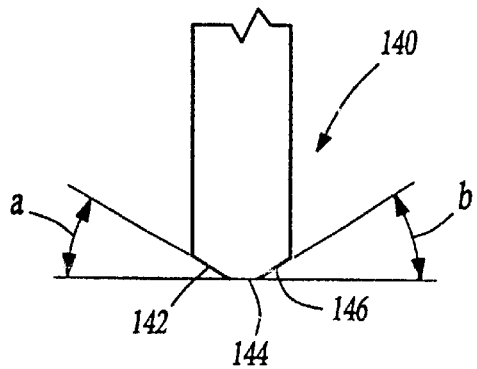
FIG. 15 shows a seventh embodiment rim end portion.

FIG. 15 shows a groove embodiment 140 having a first surface 142 formed at an angle a which improves the attachment of the rim into the disks and provides space for the melted weld material. A flat surface 144 assists the rim in resting within the groove. Another angled surface 146 is formed at an angle b, which functions to provide a space for weld material. The rim 140 is particularly well-suited to be used with the groove shown in FIG. 8.

The flat surface 70 in combination with the flat surface 114 ensures proper axial positioning. The angled surface 72, in combination with the angled surface 112 ensures that the weld material does secure the two members together. The weld material 150 is shown as a large bead which will secure the rim to the disk.

The present invention improves upon the prior art systems which have provided a rim received within a groove, by improving upon the structure of the groove and the rim. With the present invention, correct positioning of the rim relative to the disk is much more likely to be achieved. Further, a very reliable connection is assured with this invention.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. An integrated wheel, comprising:
a disc member having a forward face and a rear face said disc member defining an axis substantially parallel thereto, said rear face being formed with a groove extending into a generally planar surface, said groove being formed with a first angled surface angled relative said rear face and a second surface opposed to said first angled surface and perpendicular to said axis; and
a rim member partially extending into said groove and welded within said groove, said rim member having a contoured edge portion received within said groove and adjacent said second surface said countered edge portion comprises a first flat edge surface received upon said second angled surface.

2. The integrated wheel recited in claim 1, wherein said contoured edge portion includes an edge portion substantially equal to a shape of said second surface.

3. The integrated wheel recited in claim 1, wherein said contoured edge portion includes an angled portion at an angle substantially equal to said second surface.

4. The integrated wheel recited in claim 1, further comprising a semi-circular portion of said second surface.

5. The integrated wheel recited in claim 4, wherein said contoured edge portion includes an edge portion which defines a radius substantially equal to said semi-circular portion of said second surface.

6. The integrated wheel recited in claim 1, wherein said first angled surface and said second surface form a substantially V-like shape.

7. The integrated wheel recited in claims 1, wherein said first angled surface and said second surface intersect a flat surface.

8. The integrated wheel recited in claims 7, wherein said contoured edge portion includes a flat edge surface of a length substantially equal to said flat surface.

9. The integrated wheel recited in claims 1, wherein said contoured portion includes a wedge-shaped edge.

10. An integrated wheel, comprising:
a disc member having a forward face and a rear face said disc member defining an axis substantially parallel thereto, said rear face being formed with a groove extending into a generally planar surface, said groove being formed with a first angled surface angled relative said rear face and a second angled surface angled relative said first angled surface and perpendicular to said axis; and
a rim member partially extending into said groove and welded within said groove, said rim member having a contoured edge portion received within said groove and adjacent said second surface said countered edge portion comprises a first flat edge surface adjacent a chisel-shaped edge, said first flat surface received upon said second angled surface.

11. A intergrated wheel comprising:
a disc member having a forward face and a rear face, said disc member defining an axis substantially parallel thereto, said rear face being formed with a groove extending into a generally planar surface, said groove being formed with a first angled surface angled relative said rear face and a second surface perpendicular to said axis; and
a rim member partially extending into said groove and welded within said groove, said rim member having a contoured edge portion received within said groove and adjacent said second surface, a second edge portion opposite said contoured edge portion, said second edge portion angled relative said second surface.

12. The intergrated wheel recited in claim 11, wherein said second edge portion and said groove define a weld receiving area.

13. The intergrated wheel recited in claim 11, wherein said second edge portion and said groove define a substantially V-like shape.

14. The intergrated wheel recited in claim 11, wherein said second edge portion and said first angled surface groove define a weld receiving area.

15. The intergrated wheel recited in claim 11, further comprising a radius between said first angled surface and said second surface.

16. The intergrated wheel recited in claims 11, wherein said contoured edge portion includes a chisel-shaped edge.

17. The intergrated wheel recited in claims 11, wherein said contoured edge portion includes a flat surface.

* * * * *

UNITED STATES PATENT AND TRADEMARK OFFICE
CERTIFICATE OF CORRECTION

PATENT NO.     : 6,508,517 B2
DATED          : January 21, 2003
INVENTOR(S)    : Mikami It is certified that error appears in the above-identified patent and that said Letters Patent is hereby corrected as shown below:

<u>Column 4,</u>
Line 62, "claims" should be -- claim --.

<u>Column 6,</u>
Lines 21 and 23, "claims" should be -- claim --.

Signed and Sealed this

First Day of July, 2003

JAMES E. ROGAN
*Director of the United States Patent and Trademark Office*